UNITED STATES PATENT OFFICE.

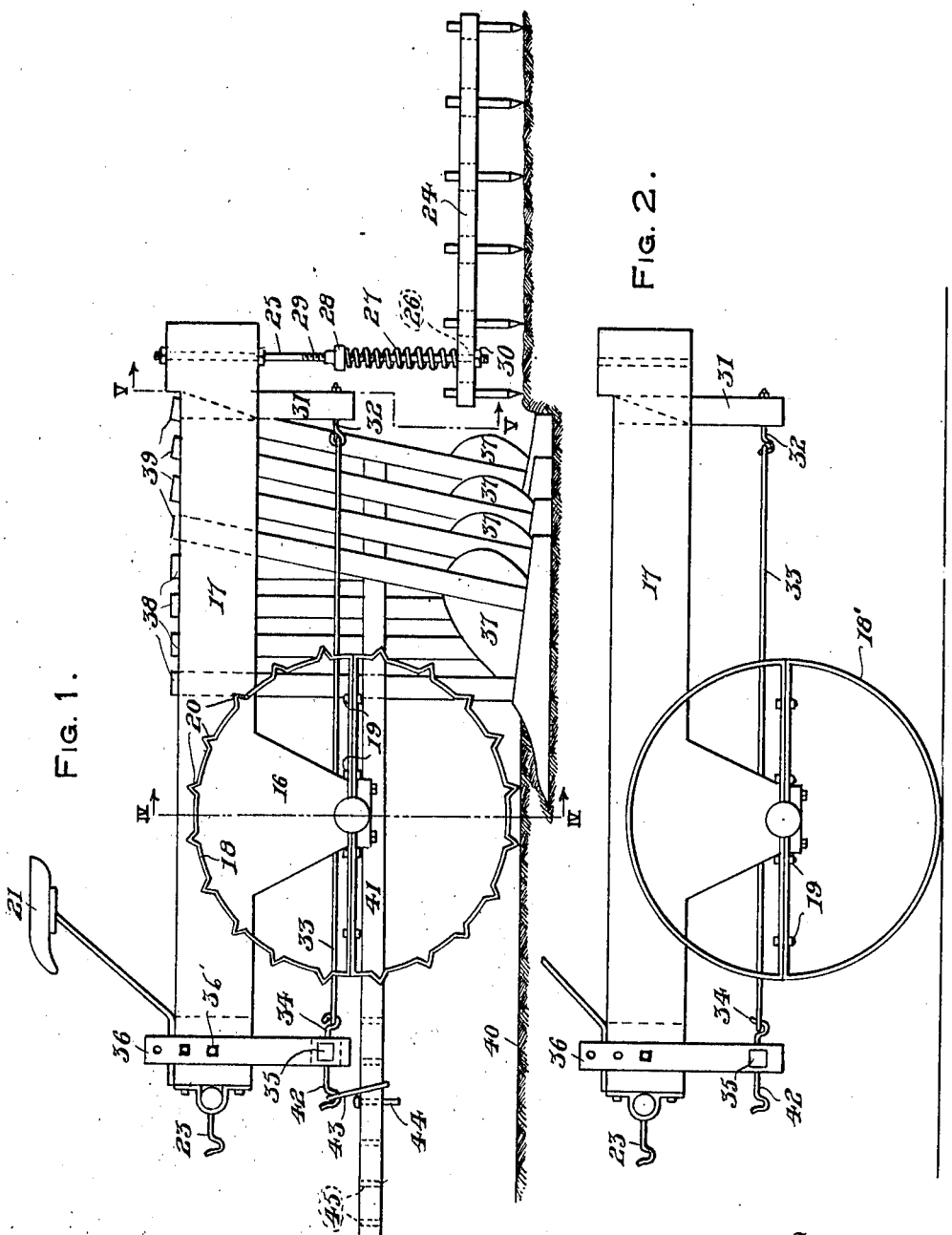

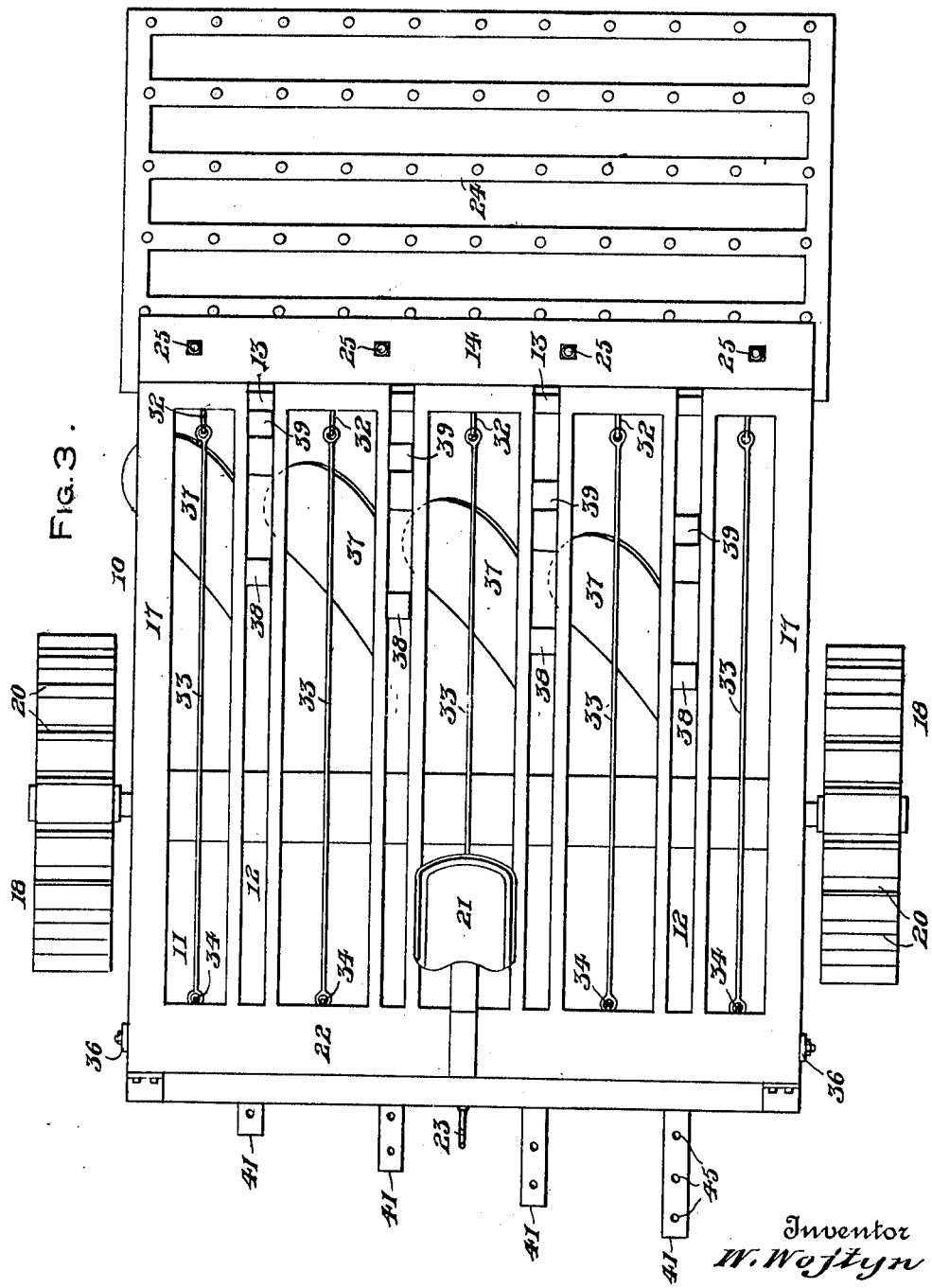

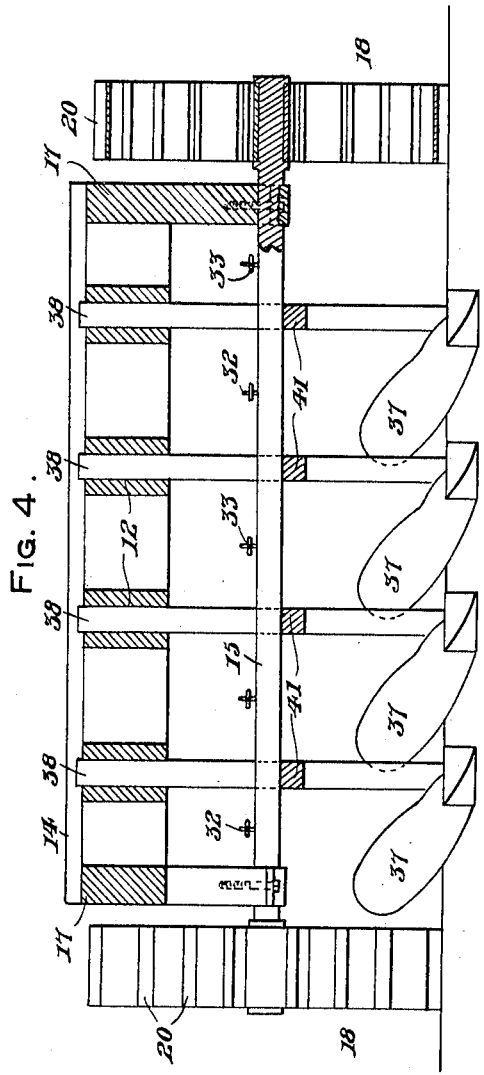
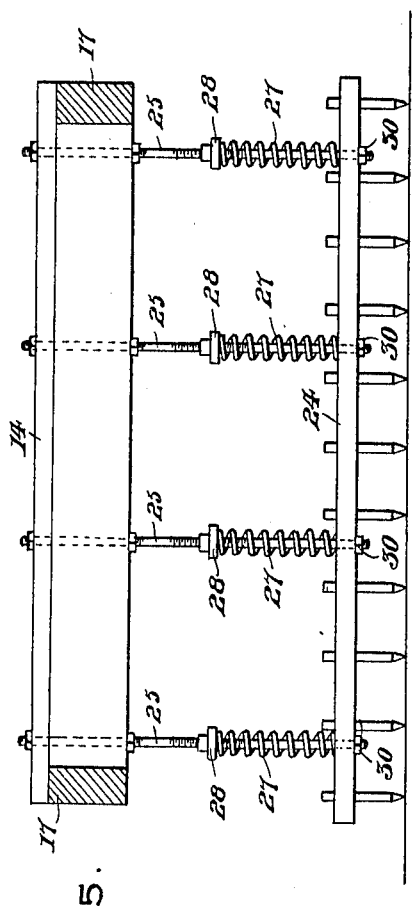

WALENTY WOJTYN, OF NEW KENSINGTON, PENNSYLVANIA.

FARMER'S TRUCK AND PLOW.

1,314,177.  Specification of Letters Patent.  Patented Aug. 26, 1919.

Application filed February 20, 1919. Serial No. 278,127.

*To all whom it may concern:*

Be it known that I, WALENTY WOJTYN, a citizen of Poland, residing at New Kensington, in the county of Westmoreland and State of Pennsylvania, have invented certain new and useful Improvements in Farmers' Trucks and Plows, of which the following is a specification.

The primary object of the invention is the provision of a plow in the nature of a multiple sulky plow whereby a plurality of furrows are made simultaneously during the travel of the vehicle over the field, the provision being made for dragging the plowed ground immediately after turning the furrows.

A further object of the invention is to provide a combined sulky plow and truck which is readily employed as a truck for carrying articles such as grain and produce and when desired is readily converted for plowing a plurality of furrows simultaneously, the invention possessing great strength and simplicity and being easy and inexpensive to manufacture.

With these general objects in view, the invention consists of the novel combination and arrangement of parts hereinafter fully described, in the accompanying drawings, and in which like reference characters designate corresponding parts throughout the several views.

In the drawings,

Figure 1 is a side elevation of the invention illustrating the same in operation, Fig. 2 is a similar view illustrating the invention employed as a truck and provided with a different form of ground wheels, the said member being broken away, Fig. 3 is a top plan view of the invention employed as a plow with the drag attached thereto and Figs. 4 and 5 are vertical transverse sectional views, taken upon lines IV—IV and V—V respectively of Fig. 1.

My invention comprises a rectangular platform 10 in the form of a frame preferably formed of wood provided with a plurality of longitudinal openings 11 for rendering the same light in weight and with longitudinal slots 12 positioned intermediate the said openings and having rear inclined ends 13 formed in the rear end or beam portion 14 of the said platform 10.

An axle 15 is rigidly secured beneath the frame 10 in depending brackets 16 carried by the opposite sides 17 thereof, a two-part wheel 18 being journaled upon each end of the axle 15, outwardly of said brackets. The wheels 18 are formed in two semi-circular portions connected together by bolts 19 so as to be removed from the axle 15 when desired, it being noted that ribs 20 are preferably provided transversely of the rim of each wheel 18 when the invention is employed as a plow, while a similar wheel 18' omitting said ribs may be employed when the device is used as a truck as illustrated in Fig. 2 of the drawings.

A driver's seat 21 is preferably mounted upon the forward end 22 of the platform 10 while a hook 23 for the attachment of draft animals or a tractor is centrally carried by said end 22. A usual form of drag or harrow such as 24 is attached for trailing rearwardly from the frame 10 by means of a plurality of vertical rods 25 secured through the rear end 14 of the frame and slidably positioned through the perforations 26 in the drag 24 with springs 27 mounted upon said rods 25 between the drag and an adjustable shoulder or collar 28 with which each of said rods is provided. It will be apparent that during the forward movement of the vehicle, the drag 24 will be propelled forwardly resiliently engaging the ground while normally held substantially horizontal, the springs 27 being adjusted in tension by turning the shoulders 28 upon the threaded portions 29 of the rods 25 and the limit of downward movement of the drag 24 being controlled by adjusting nuts 30 threaded upon the lower end portions of said rods 25.

A transverse brace 31 beneath the rear portion of the platform 10 is provided with a plurality of hooks 32 for attachment with the rear ends of longitudinal brace rods 33 having the forward ends thereof attached to a similar hook 34, mounted upon a squared shaft 35 beneath the forward end 22 of the platform. Supporting strips 36 are adjustably secured by means of screws 36' to the opposite sides of the platform in vertical positions with the shaft 35 extending therethrough so that the rods 33 act as longitudinal braces for the frame 10 being centrally positioned beneath the openings 11.

The frame 10 accommodates a separate plow for each of the slots 12, these plows being designated 37 and each having a vertical post 38 and a rearwardly and upwardly inclined post 39 extending through the adjacent slot 12 positioned thereabove. The posts 38 are normally vertical when the plows 37 are in their operative positions for turning furrows in the land or field such as indicated at 40 in Fig. 1 of the drawings.

A draft beam or tongue 41 is attached to the posts 38 and 39 of each plow 37, the said tongues being normally positioned in substantially the same horizontal plane and projecting forwardly beneath the shaft 35. Forwardly projecting hooks 42 upon the shaft 35 carry rings 43 through which the forward ends of the tongues 41 normally extend, the positions of the plows 37 being adjustable for operation thereof and maintained in desired relative positions by means of pins 44 extending through perforations 45 in the tongues 41 forwardly of said rings 43. The plows 37 are preferably positioned out of alinement with each other so that each plow from one side of the platform 10 to the other will be in advance of the adjacent plow in turning a furrow in the ground 40 as illustrated in Figs. 1 and 3 of the drawings. The inclined post 39 of the rearmost plow 37 will rest within the inclined end 13 of its respective slot 12 although it will be apparent that the plows may be positioned side by side if desired with all of the same at the rearward limit of their movements.

The complete operation of the device will be apparent from this detailed description thereof it being seen that the forward travel of the platform 10 forwardly moves the plows 37 which are pulled forwardly by the attachment of the tongues 41 to the shaft 35. The posts 38 and 39 being squared and passing through the slots 12 prevents lateral shifting of the plows 37 by preventing the said posts from turning in the slots while vertical movement of the plows 37 is permitted. In plowing through hard ground, all of the plows may be positioned with the posts 39 thereof engaging the slot ends 13 thereby adding greatly to the power exerted upon the plows 37 by the forward travel of the vehicle. The drag 24 follows up the plowing operation for suitable dragging and leveling the land after being furrowed and it will be apparent that the drag may be detached from the frame 10 by removing the rods 25 while the plows 37 are also readily removed from the frame when it is desired to employ the vehicle as a two-wheeled truck.

What I claim as new is:—

1. A plow truck comprising a platform having longitudinal openings and relatively narrow longitudinal slots positioned between said openings, a plurality of plows adapted to travel beneath the platform, an upright and a rearwardly squared inclined post carried by each plow freely positioned through said slots adapted for preventing lateral shifting movement of the plows, a forwardly projecting tongue for each plow carried by the posts thereof and attaching means for the tongues adjacent the forward end of the platform whereby the plows are adapted for forward movement with the tongues of said plows in substantially the same horizontal plane during the forward travel of the vehicle.

2. A device of the class described comprising a platform having longitudinal slots therethrough, a plurality of plows beneath the platform, squared posts upon said plows freely projecting through said slots, normally horizontal tongues carried by said posts operatively connected adjacent the forward end of the platform, ground wheels for the platform and draft connections at the forward end thereof.

3. A device of the class described comprising a platform having longitudinal slots therethrough, a plurality of plows beneath the platform, squared posts upon said plows freely projecting through said slots, normally horizontal tongues carried by said posts operatively connected adjacent the forward end of the platform, ground wheels for the platform, draft connections at the forward end thereof, detachable longitudinal brace rods provided beneath the platform between the posts of the said plows, and a driver's seat upon the platform.

In testimony whereof I affix my signature.

WALENTY WOJTYN.